United States Patent

[11] 3,537,560

| [72] | Inventor | Kenneth Secunda<br>Detroit, Michigan |
|---|---|---|
| [21] | Appl. No. | 697,210 |
| [22] | Filed | Jan. 11, 1968 |
| [45] | Patented | Nov. 3, 1970 |
| [73] | Assignee | Federal-Mogul Corporation<br>Southfield, Michigan<br>a corporation of Michigan |

[54] CONVEYING SYSTEM AND METHOD
11 Claims, 4 Drawing Figs.

[52] U.S. Cl. .................................................... 193/2,
243/1, 198/43
[51] Int. Cl. ..................................................... B65g 11/00
[50] Field of Search.......................................... 193/1, 2,
25, 38; 198/43, 45, 48, 49, 50

[56] References Cited
UNITED STATES PATENTS

| 411,864 | 10/1889 | Leaycraft..................... | 243/38 |
| 1,548,600 | 8/1925 | Hansen........................ | 198/43 |
| 3,005,536 | 10/1961 | Dabich......................... | 198/45 |
| 3,305,192 | 2/1967 | Todt et al. .................... | 243/1 |

Primary Examiner—Andres H. Nielsen
Attorney—Harness, Dickey & Pierce

ABSTRACT: A conveying system including a plurality of chutes in which circular parts of varying widths and diameters can be handled with substantially no change-over of the chutes for different part sizes.

Patented Nov. 3, 1970

3,537,560

INVENTOR.
Kenneth Secunda
BY
Harness, Dickey & Pierce
ATTORNEYS

CONVEYING SYSTEM AND METHOD

The present invention relates to conveying apparatus and method for circular parts and more particularly to a chute construction for bearing races, *i.e.* cups, cones.

In the manufacture of a range of sizes of bearing cups and cones, the cups and cones are conveyed from machine to machine conventionally by a single track or chute. Thus the same battery of machines are used to handle a variation in part sizes within the size capabilities of the machine. The single track chute utilized has a specific width and can handle a given but limited range of part sizes. However, often it is required that a wide range of sizes of cups and cones, *i.e.*, various widths and diameters, outside of the range of a single track chute, be processed through the same series of machines. Because of the great variation in part sizes it is literally impossible to accommodate all the different sizes with a single track chute with a fixed width; narrower cups and cones could wedge or lock together if the chute width were too wide while a larger bearing width and diameter might not be accommodated in that same chute. It has been normal practice to make the single track as an adjustable chute and to modify the chute width from time to time to accommodate the different bearing race sizes. This may entail a costly and time consuming process in which the machines may be shut down until the change is made. In the present invention, a chute construction is provided which will accommodate substantially all the incremental bearing size changes within the predetermined range of width and diameter of the parts with no need for change-over in the chute construction. Therefore, it is a general object of the present invention to provide for an improved chute construction.

It is another object of the present invention to provide for an improved chute construction for handling a large variety of sizes of circular parts, *i.e.* varying substantially in width and diameter.

It is still another object of the present invention to provide an improved conveying construction for conveying bearing races.

Since a machine can generally handle a range of sizes according to width and diameter, this conveying system can be set up to cover the same size range of parts as the machine. Thus, should any part not being made at a given time be required at some future date to be made on a machine that can make it, the chute or conveying system can be designed to accommodate the size range.

It is another object of the present invention to provide a novel conveying apparatus for conveying parts between a plurality of machines in which the conveying apparatus can handle substantially all variations of part sizes within the size capability of the machines.

It is still another object to provide a novel method for conveying parts generally as previously described.

It is another object to provide a novel method for conveying parts.

Other objects, features and advantages of the present invention will become apparent from the subsequent description and the appended claims, taken in conjunction with the accompanying drawings.

While the invention is shown and described specifically for handling bearing races, it is to be understood that the various features thereof are applicable for other circular or other rolling or sliding parts.

Figure 1:
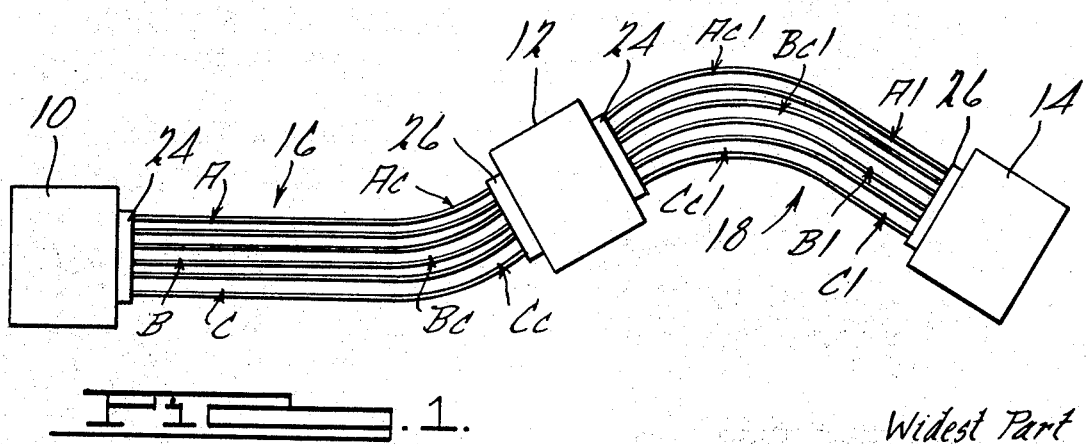
FIG. 1 is a generally pictorial view depicting one form of the present invention.

Looking now to FIG. 1, a plurality of machines, generally indicated with numerals 10, 12 and 14, are located in sequence to perform various machine operations on a plurality of bearing races which are conveyed between machines by means of conveyor assemblies 16 and 18.

Figure 2:
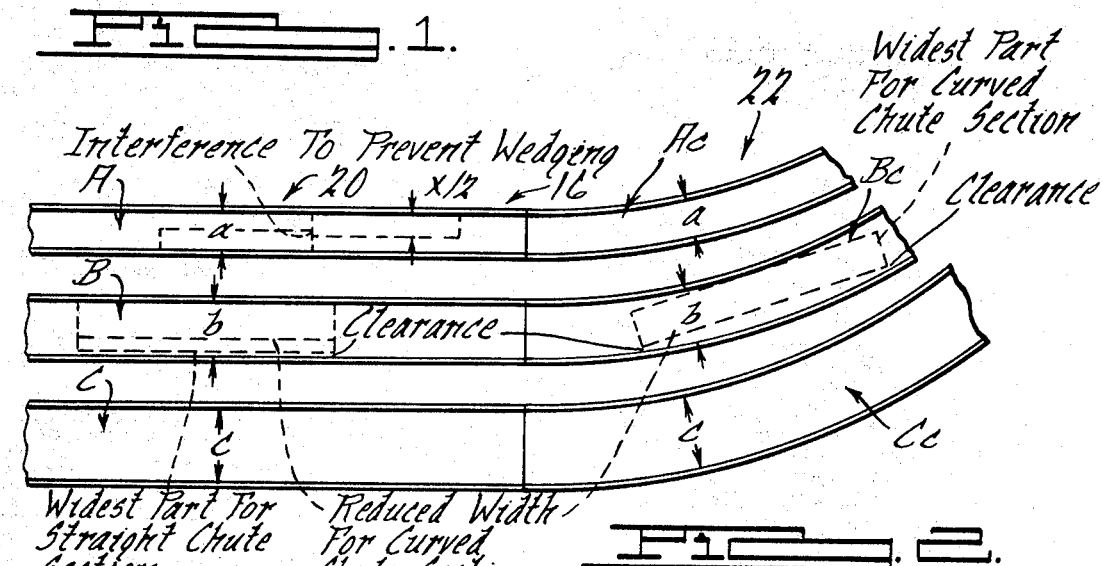
FIG. 2 is a top elevational view to increased scale of a chute construction embodying features of the present invention.

Looking now to FIG. 2, the conveyor assembly 16 includes a straight section 20 and a curved section 22. The section 20 comprises three straight chute sections A, B and C, which are connected to the section 22 to corresponding curved sections Ac, Bc and Cc, which are of generally the same width as the corresponding one of the straight sections A, B, and C. The bearings leaving the machine 10 are fed into one of the chutes A, B, C selectively by means of a gate 24. The gate 24 can be of a construction within the purview of one skilled in the art (and hence the details have been omitted for purposes of simplicity) and will connect the output from the machine 10 selectively to one of the chutes A, B, C while blocking the other two. A second gate 24 connects the output of machine 12 to assembly 18. The widths of the chutes A, B, and C are selected to accommodate substantially any size variation in bearing race width and O.D. handled by the machines 10, 12 and 14. Assume now that the smallest width bearing race to be handled by machine 10 is a width X/2. Then the width $a$ of the chute A could be no greater than X. In reality, the width $a$ of the chute A should have a maximum width slightly less than X by an amount to insure that bearings having a width of X/2 will not wedge or lock therein. The chute B will have a width $b$ which is, of course, greater than the width $a$ of chute A (and greater than X/2), but will be less than a width of 2X. The maximum width $b$ if $a$ is a maximum of X will be slightly less than 2X. With such a maximum relationship all bearing widths approximately from X/2 to 2X could be handled in chutes A and B and with lesser chute widths all bearing widths from X/2 to $b$ could be handled. The above noted process can be continued and the chute C is provided having a width $c$ which will be slightly larger than the maximum width bearing to be accommodated. The width $c$ at its maximum would be approximately 4X (with provision for the required interference between minimum sizes for that chute) and could be of a minimum at some width greater than $b$ and less than 4X. The curved sections Ac, Bc, and Cc are provided to have the same widths $a$, $b$, and $c$ as the corresponding straight sections A, B, and C. However, as can be seen from the drawings, the maximum bearing width which one of the straight sections can accommodate will be greater than that of the corresponding curved section. Thus, for the same chute widths $a$, $b$, and $c$, the curved sections Ac, Bc, and Cc cannot, as a result of the curvature therein, handle parts as wide as the straight sections. The part size limit will be determined by the actual radius of curvature of the curved chute and by the width and diameter of the bearing part (see FIG. 2). This limiting effect will be minimized by making the radius of curvature as large as possible. In actual practice it has been found that for conveying races having a range with a maximum size of generally around 2.75" in width and 8" in diameter a minimum radius of curvature of around 24 inches did not seriously limit the effectiveness of the chute. In order to cover every expected size bearing from a width of X/2 to $c$, the chutes B and C must be somewhat less than their maximum widths to compensate for the loss of capability due to the curved sections Ac, Bc, and Cc. The smaller the radius of curvature, the greater are the size limitations. Thus, with the arrangement as shown in FIG. 2, the maximum size that can be transmitted in chute A will be somewhat less than $a$ in width in order to accommodate the curvature of the curved section Ac. In order to cover a continuous range of parts, the width $b$ of the chute B must be less than twice the width $a$ of the chute A, since chute A can handle a maximum width less than $a$ to compensate for the curvature of chute Ac and for the diameter and width of the part. Chute B could handle a part of a maximum width less than $b$ because of the curvature of chute Bc and hence chute C in order to cover a continuous range, has a width $c$ less than twice the width $b$ of chute B. The largest part handled by chute C is of a width less than $c$ in order to compensate for the curvature of chute Cc. The final number of chutes, i.e., A, B, C, required will, of course, be determined by the total range of parts to be handled. It was found that to handle bearing races varying in width from .7874" to 2.75" and with a maximum diameter of 8", three chutes were adequate to cover substantially all of the anticipated widths and diameters of cups and cones with width "$a$" being 1-7/16", width $b$ being 2" and width $c$ being 2-13/16".

In order to somewhat offset the limitation imposed by the curved sections Ac, Bc, and Cc, one or more of the curved sections can be made wider than the corresponding straight sections. Such a structure is shown in FIG. 3.

Figure 3:
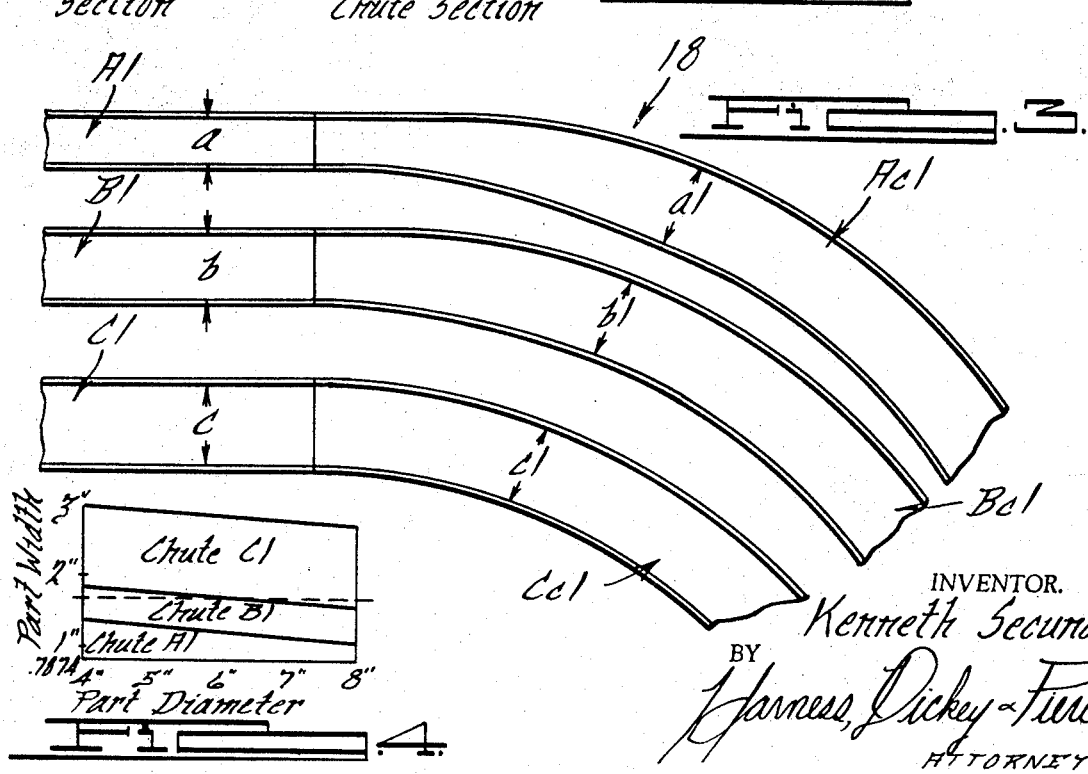
FIG. 3 is a top elevational view to increased scale of a different chute construction.

In FIG. 3 the chutes A1, B1, and C1 are straight sections and are connected to curved sections Ac1, Bc1, and Cc1. The straight sections A1, B1, and C1 have widths of $a$, $b$, and $c$, respectively, while the curved have widths of $a$, $b$, and $c$, respectively, which are wider than $a$, $b$, and $c$. Thus, in such a construction, a slightly larger maximum bearing size can be accommodated in each section and a larger range of parts can be accommodated. One or more of the sections Ac1, Bc1, and Cc1 can be made wider than the corresponding one of the straight chutes A1, B1, and C1 and for the range of parts having a width from .7874" to 2.75" and a maximum diameter of 8". It has been found that the width $c1$ can be 3⅛" with $a1$ and $b1$ equal to $a$ and $b$ and equal to 1-7/16" and 2", respectively.

Figure 4:
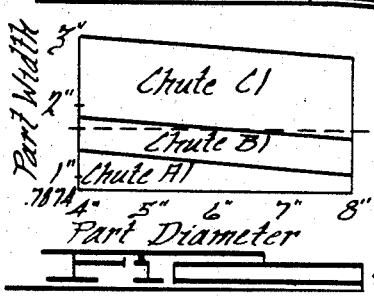
FIG. 4 is a graph for predicting the chute to be used for each part size.

Because there are infinite size combinations of width and diameter that can occur within the predetermined size range and because both width and diameter are collectively responsible for the particular chute through which the part should be conveyed, a graph (FIG. 4) was developed to determine the chute through which the part could be conveyed in order to avoid wedging, locking and on the other hand to allow the part to flow freely without any restriction in the chute. The graph of FIG. 3 is for the chute and part sizes previously noted. From the graph it can be seen that both diameter and width have an effect on the chute size in which the part rides. The dot and dash line shows that when the part is 1.7" in width and has 4" O.D. it will ride in chute B1 whereas at 8" O.D. the same width part will ride in chute C1. Such a chart eliminates the need to calculate the chute to be used for each different size.

Gates 26 connect the chutes to the inlet of the machine 12 and 14 and are similar in construction to the gates 24 such that only a selected one of the chutes Ac, Bc, Cc, and Ac1, Bc1, or Cc1 will be connected to the input of the associated one of the machines 12 or 14. Again the details of gates 26 are within the purview of one skilled in the art and have been omitted for purposes of simplicity.

Note that the construction as shown has other advantages in that it does provide a capability of storing, while separated, bearings of various sizes.

It should be noted that while the description of the present invention has been made with regard to bearing race constructions, it is applicable for other cylindrical parts.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A gravity conveying apparatus comprising inclined chutes for conveying flat, circular parts in which said parts roll downwardly, said parts varying in width from a minimum width of A to a maximum width of B where B is greater than around 2A and generally no greater than 4A comprising: a first chute having a width X which is greater than A and less than 2A and a second chute having a width Y which is slightly greater than B whereby substantially all widths from A to B can be transmitted in either said first chute or said second chute without wedging.

2. The apparatus of claim 1 further comprising means for directing parts into a selected one of the chutes.

3. The apparatus of claim 1 with said first chute and said second chute being straight sections.

4. The apparatus of claim 3 further comprising first and second curved chute sections connected to said first and said second straight chutes, respectively.

5. The apparatus of claim 4 with said curved chute sections being generally of the same width as the associated one of said straight chutes.

6. The apparatus of claim 4 with at least one of said curved chute sections being of a larger width than the associated one of said straight chutes.

7. The apparatus of claim 4 for conveying bearing races having a maximum size of around 2.75" in width and around 8" in outside diameter with the radius of curvature of said curved sections being a minimum of around two feet.

8. The apparatus of claim 7 further comprising means for directing parts into a selected one of the chutes.

9. The apparatus of claim 8 for carrying bearing races of a maximum width of C which is greater than B and generally less than 2B and further comprising a third chute having a width Z which is slightly greater than C.

10. The apparatus of claim 9 when adapted to convey races varying in width from around .75" to about 2.75" having X around 1.5", Y around 2" and Z around 3".

11. The conveyor of claim 9 with said straight chutes having widths of 1.5", 2" and 2-13/16" and with said curved sections having a maximum width of approximately 3⅛".

PO-1050
(5/69)

UNITED STATES PATENT OFFICE
CERTIFICATE OF CORRECTION

Patent No. 3,537,560  Dated November 3, 1970

Inventor(s) Kenneth Secunda

It is certified that error appears in the above-identified patent and that said Letters Patent are hereby corrected as shown below:

Column 3, line 17, delete "a, b and c" and substitute therefor
--a1, b1 and c1--

SIGNED AND
SEALED
MAR 9 1971

(SEAL)
Attest:

Edward M. Fletcher, Jr.
Attesting Officer

WILLIAM E. SCHUYLER, JR.
Commissioner of Patents